US010522853B2

(12) United States Patent
Yamada et al.

(10) Patent No.: US 10,522,853 B2
(45) Date of Patent: Dec. 31, 2019

(54) FUEL CELL SYSTEM, FUEL CELL VEHICLE AND CONTROL METHOD OF FUEL CELL SYSTEM

(71) Applicant: TOYOTA JIDOSHA KABUSHIKI KAISHA, Toyota-shi, Aichi-ken (JP)

(72) Inventors: Takashi Yamada, Hekinan (JP); Mitsuhiro Nada, Toyota (JP); Tsuyoshi Maruo, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 642 days.

(21) Appl. No.: 14/922,795

(22) Filed: Oct. 26, 2015

(65) Prior Publication Data

US 2016/0141645 A1    May 19, 2016

(30) Foreign Application Priority Data

Nov. 14, 2014    (JP) ................................. 2014-231826

(51) Int. Cl.
  *H01M 8/04*       (2016.01)
  *H01M 8/04029*    (2016.01)
  (Continued)

(52) U.S. Cl.
CPC ......... *H01M 8/04029* (2013.01); *B60L 58/33* (2019.02); *H01M 8/04052* (2013.01); *H01M 8/04067* (2013.01); *H01M 8/04619* (2013.01); *H01M 8/04723* (2013.01); *H01M 8/04731* (2013.01); *H01M 8/04768* (2013.01); *B60L 2240/12* (2013.01); *B60L 2240/36* (2013.01); *B60L 2240/662* (2013.01); *H01M 2250/20* (2013.01); *Y02T 10/7291* (2013.01);
(Continued)

(58) Field of Classification Search
CPC ......... H01M 8/04029; H01M 8/04052; H01M 9/04067; H01M 8/04723; H01M 8/04067
See application file for complete search history.

(56) References Cited

U.S. PATENT DOCUMENTS 6,651,761 B1    11/2003   Hrovat et al.
2006/0124081 A1  6/2006   Hannesen et al.
(Continued)

FOREIGN PATENT DOCUMENTS

DE    10 2005 058 687 A1    7/2006
DE    10 2008 011 308 A1    10/2008
(Continued)

*Primary Examiner* — Ula C Ruddock
*Assistant Examiner* — Frank A Chernow
(74) *Attorney, Agent, or Firm* — Finnegan, Henderson, Farabow, Garrett & Dunner, LLP

(57) ABSTRACT

A fuel cell system comprises: a fuel cell; a cooling system circuit including a cooling liquid supply path configured to supply a cooling liquid to the fuel cell, a radiator configured to cool down the cooling liquid, a radiator fan, and a cooling liquid pump provided in the cooling liquid supply path to feed the cooling liquid to the fuel cell; a controller; and a speedometer configured to obtain a speed of the fuel cell vehicle, wherein the controller is capable of performing a first cooling control that sets an upper limit value of driving amount of the radiator fan according to the speed of the fuel cell vehicle and regulates a flow rate of the cooling liquid pump or the driving amount of the radiator fan under the upper limit value of the driving amount of the radiator, so as to cool down the fuel cell.

19 Claims, 7 Drawing Sheets

(51) Int. Cl.
    *H01M 8/04007*     (2016.01)
    *H01M 8/04701*     (2016.01)
    *H01M 8/04537*     (2016.01)
    *H01M 8/04746*     (2016.01)
    *B60L 58/33*     (2019.01)

(52) U.S. Cl.
    CPC ................ *Y02T 90/16* (2013.01); *Y02T 90/32* (2013.01); *Y02T 90/34* (2013.01)

(56) References Cited

U.S. PATENT DOCUMENTS

| | | |
|---|---|---|
| 2008/0217080 A1 | 9/2008 | Maier |
| 2011/0076584 A1 | 3/2011 | Katano |

FOREIGN PATENT DOCUMENTS

| | | |
|---|---|---|
| JP | 2004-288516 A | 10/2004 |
| JP | 2005-150019 A | 6/2005 |
| JP | 2005-166540 A | 6/2005 |
| JP | 2006-73404 | 3/2006 |
| JP | 2006-226629 A | 8/2006 |
| JP | 2009-129848 | 6/2009 |
| JP | 2009-140696 | 6/2009 |
| JP | 2009-301739 | 12/2009 |
| JP | 2010-282808 | 12/2010 |

| HEAT RELEASE VALUE Q | FLOW SPLIT RATIO dr (RATIO OF SPLIT FLOW TO RADIATOR) | ROTATION SPEED rw OF W/P | DRIVE VOLTAGE Vo OF RADIATOR FAN |
|---|---|---|---|
| ~Q0 | 0 | 0 | 0 |
| Q0~Q1 | 0~1 | rw1 | 0 |
| Q1~Q2 | 1 | rw1~rw2 | 0 |
| Q2~Q3 | 1 | rw2 | 0~Vo1 |
| Q3~Q4 | 1 | rw2 | Vo1~Vo2 |
| Q4~Q5 | 1 | rw2~rw3 | Vo2 |
| Q5~Q6 | 1 | rw3 | Vo2~Vo3 |

FUEL CELL SYSTEM, FUEL CELL VEHICLE AND CONTROL METHOD OF FUEL CELL SYSTEM

CROSS-REFERENCE TO RELATED APPLICATIONS

The present application claims priority from Japanese patent application No. 2014-231826 filed on Nov. 14, 2014, the disclosure of which is hereby incorporated by reference into this application in its entirety.

BACKGROUND

Field

The present invention relates to a fuel cell system, a fuel cell vehicle and a control method of the fuel cell system.

Related Art

A fuel cell system disclosed in JP 2009-140696A includes a fuel cell, a cooling medium flow path that is configured to supply a cooling medium to a fuel cell stack, a cooling medium circulation pump that is configured to circulate the cooling medium to the fuel cell and a radiator, and a cooling fan that is configured to blast the air to the radiator and thereby cool down the cooling medium.

The cooling fan has low power consumption. Increasing the rotation speed of the cooling fan to increase the amount of wind applied to the radiator accordingly ensures the higher cooling efficiency and the better fuel consumption, compared with increasing the rotation speed of the cooling medium circulation pump to increase the flow rate of the cooling medium supplied to the radiator. The cooling fan, however, generally has large noise and vibration (hereinafter may be abbreviated as NV) than the cooling medium circulation pump. This leads to a difficulty in satisfying both reduction of the fuel consumption and suppression of noise and vibration.

SUMMARY

In order to achieve at least part of the foregoing, the present invention provides various aspects described below.

(1) According to one aspect of the invention, there is provided a fuel cell system that is mounted on a fuel cell vehicle. The fuel cell system comprises: a fuel cell; a cooling system circuit including a cooling liquid supply path that is configured to supply a cooling liquid to the fuel cell, a radiator that is configured to cool down the cooling liquid, a radiator fan and, a cooling liquid pump that is provided in the cooling liquid supply path to feed the cooling liquid to the fuel cell; a controller; and a speedometer that is configured to obtain a speed of the fuel cell vehicle. The controller is capable of performing a first cooling control that sets an upper limit value of driving amount of the radiator fan according to the speed of the fuel cell vehicle and regulates a flow rate of the cooling liquid pump or the driving amount of the radiator fan under the upper limit value of the driving amount of the radiator, so as to cool down the fuel cell. In a fuel cell vehicle, increasing a vehicle speed generally increases noise and vibration (NV), for example, wind noise, road noise and vibration caused by friction of wheels against the road surface, and noise and vibration of a motor. Increasing such noise and vibration makes noise and vibration caused by a radiator fan unnoticeable. The fuel cell system of this aspect performs the first cooling control that sets the upper limit of the driving amount of the radiator fan according to the speed of the fuel cell vehicle and regulates the flow rate of the cooling liquid pump or the driving amount of the radiator fan under the upper limit value, so as to cool down the fuel cell. This achieves both suppression of noise vibration and reduction of power consumption (improvement of fuel consumption).

(2) The fuel cell system according to the aspect before, in the first cooling control, the controller may calculate a heating value of the fuel cell from an amount of power generation by the fuel cell, and regulate the flow rate of the cooling liquid pump and the driving amount of the radiator fan under the upper limit value of the driving amount of the radiator fan, such that the heating value is released while minimizing total power consumption of the cooling liquid pump and the radiator fan. The fuel cell system of this aspect achieves both suppression of noise vibration and reduction of power consumption (improvement of fuel consumption).

(3) The fuel cell system according to the aspect before, when the heating value is not entirely releasable from the cooling system circuit in the first cooling control, the controller may cause a heat quantity corresponding to a difference of subtraction of a heat release value from the heating value to be accumulated in the cooling liquid, and even after the heating value becomes lower than the heat release value, the controller may maintain the flow rate of the cooling liquid pump and the driving amount of the radiator fan until temperature of the cooling liquid decreases to or below a predetermined temperature. In the fuel cell system of this aspect, heat quantity is accumulated in the cooling liquid to increase the temperature of the cooling liquid. When the heating value is lower than the heat release value, the temperature of the cooling liquid decreases. The fuel cell system of this aspect maintains the driving amount of the cooling liquid pump until the temperature of the cooling liquid decreases to or below the predetermined temperature. This accelerates decreasing the temperature of the fuel cell. The fuel cell system of this aspect maintains the flow rate of the cooling liquid pump and the driving amount of the radiator fan until the accumulated heat quantity becomes equal to or lower than a predetermined value. This suppresses overcooling by a delayed temperature response and resulting increase in power consumption.

(4) The fuel cell system according to the aspect before, when the heat quantity accumulated in the cooling liquid is released in the first cooling control, the controller may set a lower driving amount that is lower than the upper limit value set according to the speed of the fuel cell vehicle, and maintain the flow rate of the cooling liquid pump and the driving amount of the radiator fan while using the lower driving amount as an upper limit until the temperature of the cooling liquid decreases to or below a predetermined temperature. The fuel cell system of this aspect maintains the flow rate of the cooling liquid pump and the driving amount of the radiator face, based on the temperature of the cooling liquid. This configuration accordingly does not need to calculate the accumulated heat quantity.

(5) The fuel cell system according to the aspect before, when the heating value is not entirely releasable from the cooling system circuit in the first cooling control, the controller may cause a heat quantity corresponding to a difference of subtraction of a heat release value from the heating value to be accumulated in the cooling liquid, and even after the heating value becomes lower than the heat release value, the controller may maintain the flow rate of the cooling liquid pump and the driving amount of the radiator fan until the accumulated heat quantity decreases to or below a predetermined value. The fuel cell system of this aspect accelerates cooling of the fuel cell.

(6) The fuel cell system according to the aspect before, when the heat quantity accumulated in the cooling liquid is released in the first cooling control, the controller may set a lower driving amount that is lower than the upper limit value set according to the speed of the fuel cell vehicle, and drive the cooling liquid pump and the radiator fan while using the lower driving amount as an upper limit until the accumulated heat quantity decreases to or below a predetermined value.

(7) The fuel cell system according to the aspect before, when the heating value is not entirely releasable in the first cooling control and an accumulated heat quantity by accumulating a difference of subtraction a heat release value from the heating value in the cooling liquid is higher than a predetermined heat quantity, the controller may be capable of performing a second cooling control that change the upper limit value of the driving amount of the radiator fan set according to the speed of the fuel cell vehicle to a higher driving amount, and regulate the flow rate of the cooling liquid pump and the driving amount of the radiator fan while using the higher driving amount as a new upper limit value, so as to cool down the fuel cell. The fuel cell system of this aspect gives priority to cooling of the fuel cell.

(8) The fuel cell system according to the aspect before, when the heating value is not entirely releasable in the first cooling control and temperature of the cooling liquid is higher than a predetermined temperature, the controller may be capable of performing a second cooling control that changes the upper limit value of the driving amount of the radiator fan set according to the speed of the fuel cell vehicle to a higher driving amount, and regulates the flow rate of the cooling liquid pump and the driving amount of the radiator fan while using the higher driving amount as a new upper limit value, so as to cool down the fuel cell. The fuel cell system of this aspect gives priority to cooling of the fuel cell when the heating value is not entirely releasable in the first cooling control and the temperature of the cooling liquid is higher than the predetermined temperature.

(9) The fuel cell system according to the aspect before, in the first cooling control, the controller may divide a heat release capacity range specified by the flow rate of the cooling liquid pump and the driving amount of the radiator fan into at least two sections, and changes one of the flow rate of the cooling liquid pump and the driving amount of the radiator fan while fixing the other, in order to achieve a heat release value in each of the at least two sections by minimum electric power. The fuel cell system of this aspect controls only one of the flow rate of the cooling liquid pump and the driving amount of the radiator fan, while fixing the other. This simplifies the control.

(10) The fuel cell system according to the aspect before may comprise: bypass piping that is configured to cause a flow of the cooling liquid discharged from the fuel cell to bypass the radiator and to be supplied to the cooling liquid pump; and a flow-dividing valve that is configured to divide the flow of the cooling liquid discharged from the fuel cell into the radiator and the bypass piping, wherein in the first cooling control, the controller may calculate a heating value of the fuel cell from an amount of power generation by the fuel cell, and regulate the flow rate of the cooling liquid pump, the driving amount of the radiator fan and a flow split ratio of the flow-dividing value under the upper limit value of the driving amount of the radiator fan, such that the heating value is released while minimizing total power consumption of the cooling liquid pump and the radiator fan. The fuel cell system of this aspect further comprises the bypass piping and the flow-dividing valve and performs cooling control by additionally using the flow split ratio.

(11) The fuel cell system according to the aspect before, in the first cooling control, the controller may divide a heat release capacity range specified by the flow rate of the cooling liquid pump, the driving amount of the radiator fan and the flow split ratio of the flow-dividing valve into at least two sections, and change one of the flow rate of the cooling liquid pump, the driving amount of the radiator fan and the flow split ratio of the flow-dividing valve, in order to achieve a heat release value in each of the at least two sections by minimum electric power. The fuel cell system of this aspect controls only one of the flow rate of the cooling liquid pump, the driving amount of the radiator fan and the flow split ratio of the flow-dividing valve, while fixing the remaining two. This simplifies the control.

The invention may be implemented by any of various aspects other than the fuel cell system described above, for example, a fuel cell vehicle and a control method of the fuel cell system.

DESCRIPTION OF THE EMBODIMENTS

Figure 1:
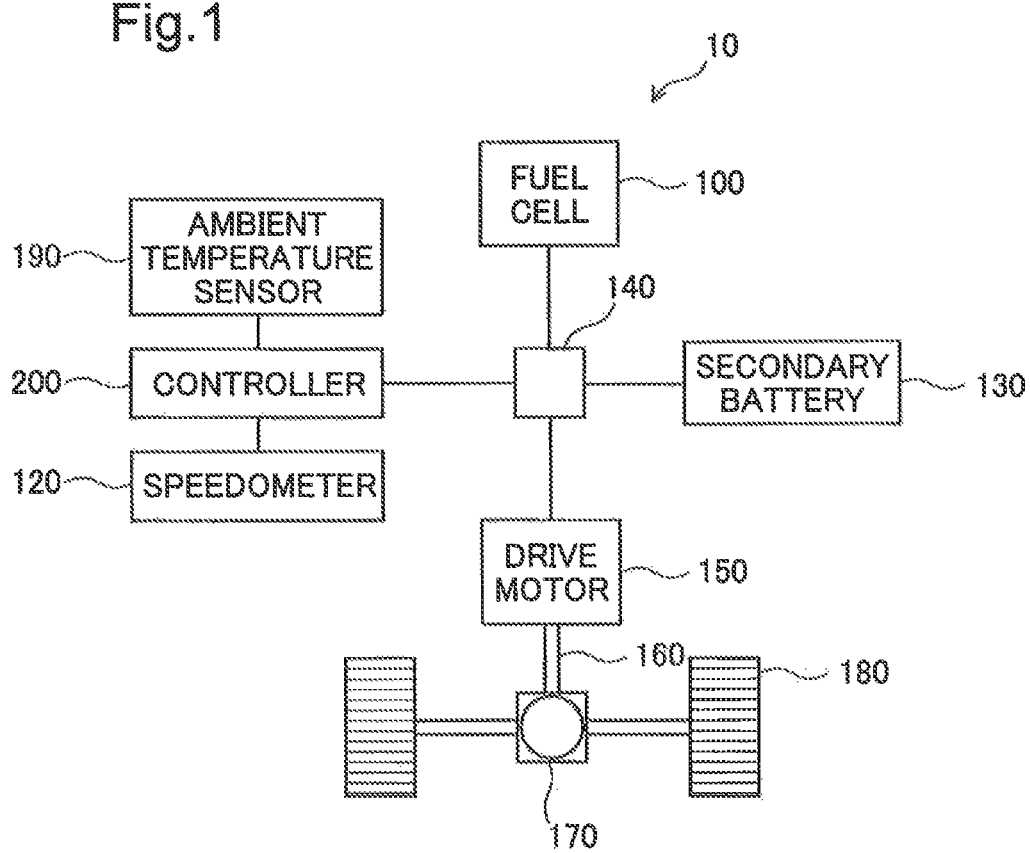
FIG. 1 is a diagram illustrating a fuel cell vehicle with a fuel cell mounted thereon.

First Embodiment:

FIG. 1 is a diagram illustrating a fuel cell vehicle 10 with a fuel cell mounted thereon (hereinafter may be simply referred to as "vehicle 10"). The vehicle 10 includes a fuel cell 100, a controller 200 (also called ECU (electronic control unit)), a speedometer 120, a secondary battery 130, an electric power distribution controller 140, a drive motor 150, a driveshaft 160, a power distribution gear 170, wheels 180 and an ambient temperature sensor 190.

The fuel cell 100 is a power generation device that is configured to generate and output electric power through electrochemical reaction of a fuel gas and an oxidizing gas. The controller 200 controls the operations of the fuel cell 100, the secondary battery 130 and the electric power distribution controller 140. The controller 200 uses the fuel cell 100 as a main power source of the vehicle 10 but may use the secondary battery 130 as an electric power source to drive the vehicle 10 in the case where the fuel cell 100 has a small power output, for example, immediately after starting the vehicle 10. For example, a nickel hydride battery or a lithium ion battery may be employed for the secondary battery 130. The secondary battery 130 may be charged directly with electric power output from the fuel cell 100 or may be charged with electric power regenerated from kinetic energy of the vehicle 10 by the driver motor 150 during deceleration of the vehicle 10. The electric power distribution controller 140 receives an instruction from the controller 200 and controls distribution into electric power that is to be output from the fuel cell 100 to the drive motor 150 and electric power that is to be output from the secondary battery 130 to the driver motor 150. The electric power distribution controller 140 also receives an instruction from the controller 200 during deceleration of the vehicle 10 and outputs electric power regenerated by the drive motor 150 to the secondary battery 130. The drive motor 150 serves as a motor to drive the vehicle 10. The drive motor 150 serves as a generator during deceleration of the vehicle 10 to regenerate electric energy from the kinetic energy of the vehicle 10. The driveshaft 160 transmits the driving force output from the drive motor 150 to the power distribution gear 170. The power distribution gear 170 distributes the driving force into the left and right wheels 180. The speedometer 120 measures the speed of the vehicle 10. The ambient temperature sensor 190 measures the temperature of the ambient air.

Figure 2:
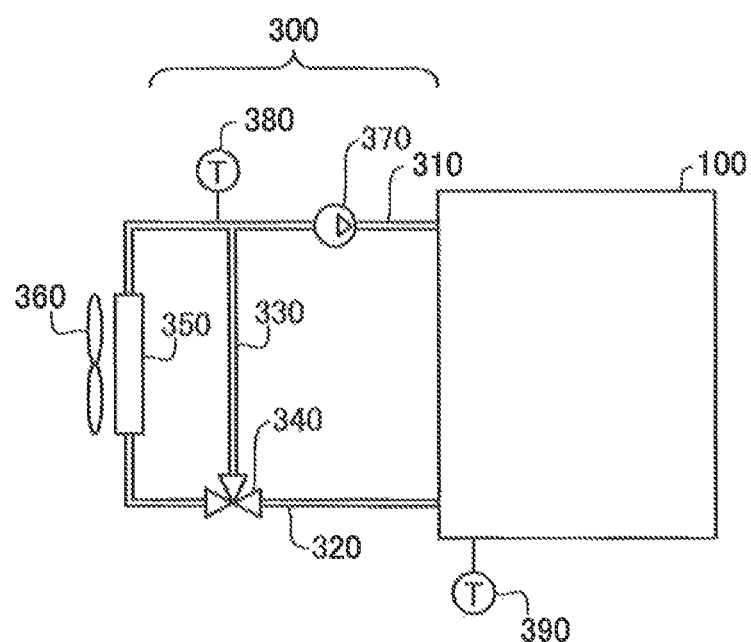
FIG. 2 is a diagram illustrating the fuel cell and a cooling system circuit for the fuel cell.

FIG. 2 is a diagram illustrating the fuel cell 100 and a cooling system circuit 300 for the fuel cell 100. A fuel cell system including the fuel cell 100 has an oxidizing gas supply and discharge circuit and a fuel gas supply and discharge circuit, in addition to the cooling system circuit 300. The following describes the cooling system circuit 300, while description of the oxidizing gas supply and discharge circuit and the fuel gas supply and discharge circuit is omitted herein.

The cooling system circuit 300 includes a cooling liquid supply piping 310, a cooling liquid discharge piping 320, a bypass piping 330, a flow dividing valve 340, a radiator 350, a radiator fan 360 (hereinafter may be simply referred to as "fan 360"), a cooling liquid pump 370 and temperature sensors 380 and 390. This embodiment uses water as the cooling liquid. Accordingly the cooling liquid is also called "cooling water", and the cooling liquid pump 370 is also called "cooling water pump 370" or "water pump (W/P) 370". In the drawings, the cooling liquid pump 370 is shown as "W/P".

The cooling liquid is supplied through the cooling liquid supply piping 310 to the fuel cell 100, while being discharged from the fuel cell 100 to the cooling liquid discharge piping 320. The cooling liquid supply piping 310 is also called "cooling liquid supply path". The radiator 350 is connected with the cooling liquid supply piping 310 and the cooling liquid discharge piping 320. The bypass piping 330 is also connected with the cooling liquid supply piping 310 and the cooling liquid discharge piping 320 to make the flow of cooling liquid bypassing the radiator 350. The flow-dividing valve 340 is provided at a connecting point of the cooling liquid discharge piping 320 and the bypass piping 330 to divide the flow of cooling liquid through the cooling liquid discharge piping 320 into the radiator 350 and the bypass piping 330. The radiator 350 is provided with the radiator fan 360. The radiator fan 360 serves to blast the air to the radiator 350 and cool down the cooling liquid flowing through the radiator 350. The cooling liquid pump 370 is located downstream of the radiator 350 to supply the cooling liquid to the fuel cell 100. The temperature sensor 380 is located on the radiator 350—side of a connecting point of the cooling liquid supply piping 310 and the bypass piping 330, and the temperature sensor 390 is mounted to the fuel cell 100. The temperature sensor 380 measures the temperature of the cooling liquid that is supplied to the fuel cell 100. The temperature sensor 390 measures the temperature of the fuel cell 100. In a modified configuration, the temperature sensor 390 may be located at a position close to the fuel cell 100 in the cooling liquid discharge piping 320 to measure the temperature of the cooling liquid that is discharged from the fuel cell 100. The cooling liquid discharged from the fuel cell 100 is warmed by the fuel cell 100 and may thus be used as a heat source for heating the interior of the vehicle 10. The cooling liquid may be used for an intercooler of the fuel gas, as well as for the fuel cell 100. This application is not specifically described herein.

According to this embodiment, the cooling liquid pump 370 is driven to supply the cooling liquid from the cooling liquid supply piping 310 to the fuel cell 100. The cooling liquid is discharged from the fuel cell 100 to the cooling liquid discharge piping 320, after cooling down the fuel cell 100. The flow of the cooling liquid is divided into the radiator 350 and the bypass piping 330 by the flow-dividing valve 340. The split flow of cooling liquid into the radiator 350 is cooled down by the radiator 350, while the split flow of cooling liquid into the bypass piping 330 is not cooled down. The controller 200 regulates the flow ratio (flow split ratio) of the cooling liquid flowing through the radiator 350 and the cooling liquid flowing through the bypass piping 330, the rotation speed (drive voltage) of the radiator fan 360 and the flow rate of the cooling liquid pump 370, so as to control the temperature of the cooling liquid and control cooling of the fuel cell 100.

Figure 3:
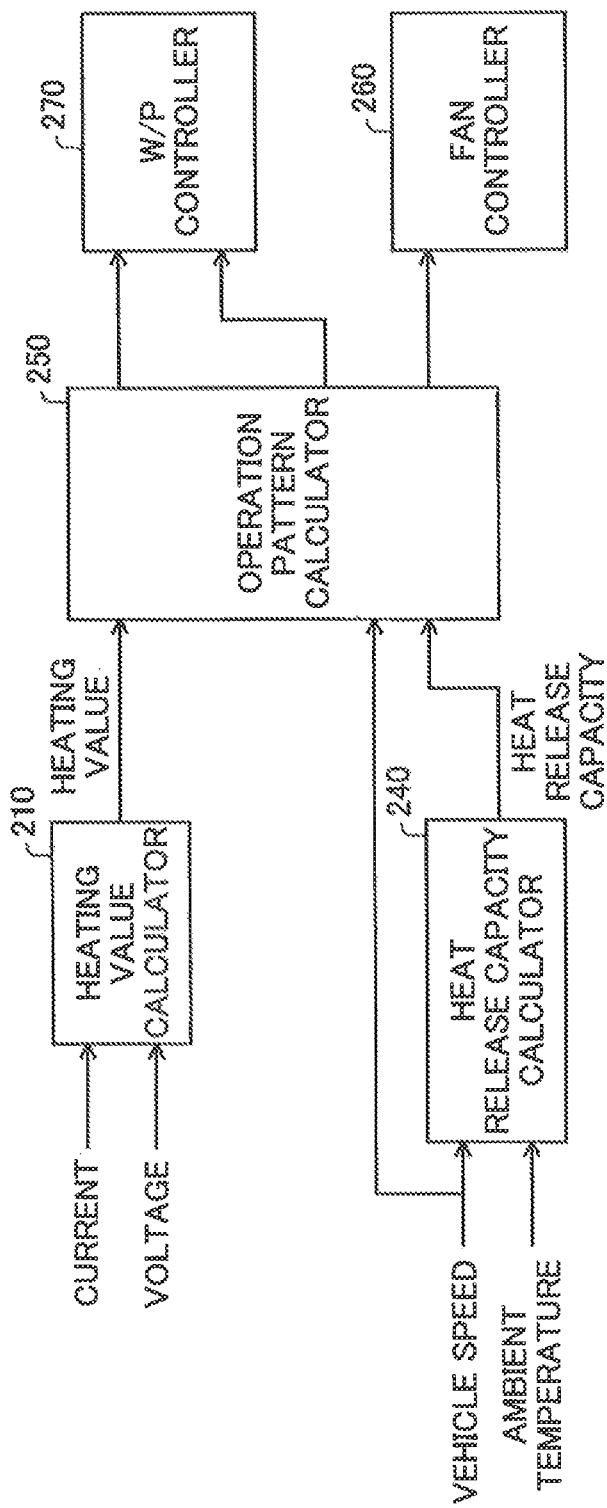
FIG. 3 is a control block diagram illustrating the controller to control the cooling liquid pump and the radiator fan.

FIG. 3 is a control block diagram illustrating the controller 200 to control the cooling liquid pump 370 and the radiator fan 360. The controller 200 includes a heating value calculator 210, a heat release capacity calculator 240, an operation pattern calculator 250, a fan controller 260 and a cooling liquid pump controller 270 (W/P controller in FIG. 3). The heating value calculator 210 calculates an amount of heat generation or heating value of the fuel cell 100 from an output (current and voltage) generated by the fuel cell 100. More specifically, the heating value calculator 210 uses an I-V characteristic of the fuel cell 100, a higher heating value (HHV) and a lower heating value (LHV) to calculate the heating value of the fuel cell 100. The heating value denotes a value between the HHV and the LHV. The "HHV" herein denotes a heat quantity corresponding to the generated output in the case where liquid water is produced by completely converting the fuel gas into electric power. The "LHV" herein denotes a heat quantity corresponding to the generated output in the case where water vapor is produced by completely converting the fuel gas into electric power. The LHV is a value obtained by subtracting latent heat of condensation of water vapor from the HHV.

The heat release capacity calculator 240 calculates a heat quantity releasable from the cooling system circuit 300 (also called "heat release capacity"). The releasable heat quantity is calculated by using the vehicle speed of the vehicle 10 and the ambient temperature. A decrease in ambient temperature leads to a decrease in temperature of the air supplied to the radiator 350 and thereby increases the releasable heat quantity. The radiator 350 receives the wind produced by running of the vehicle 10, in addition to the air blasted by the radiator fan 360. An increase in vehicle speed leads to an increase in amount of wind and thereby increases the releasable heat quantity.

The operation pattern calculator 250 determines an operation pattern of the flow-dividing valve 340, the radiator fan 360 and the cooling liquid pump 370 using the heating value calculated by the heating value calculator 210 and the releasable heat quantity calculated by the heat release capacity calculator 240. The operation pattern may be determined in advance by experiment or the like. A concrete example of the operation pattern will be described later. The fan controller 260 controls the driving amount of the radiator fan 360, and the cooling liquid pump controller 270 controls the operation of the cooling liquid pump 370. The driving amount of the radiator fan 360 is controlled by regulating the drive voltage of the radiator fan 360.

Figures 4, 5:
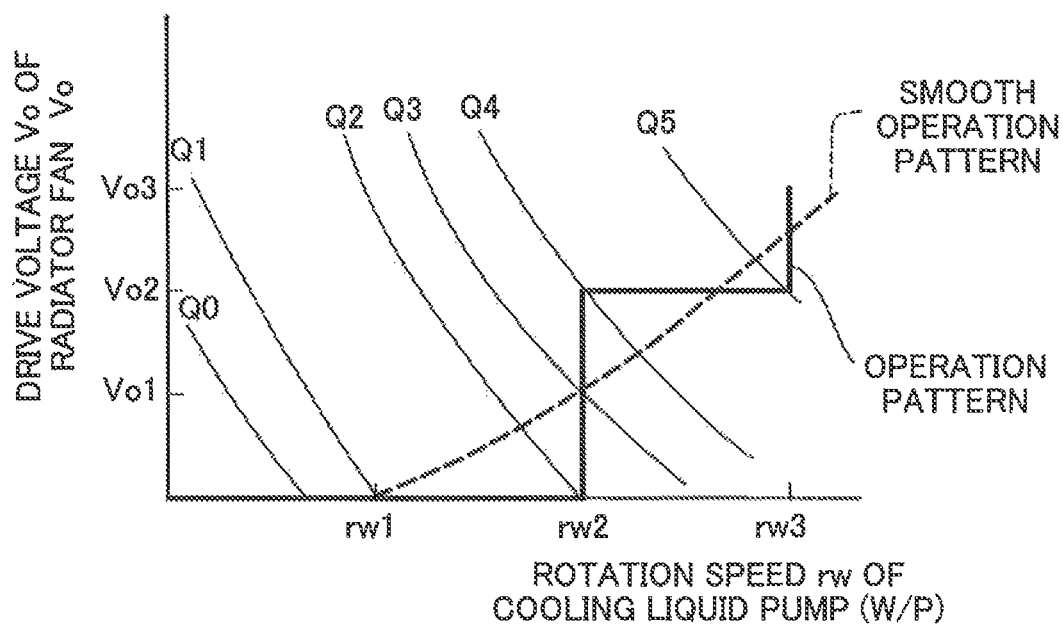
FIG. 4 is a graph showing variations in releasable heat quantity and an operation pattern with regard to rotation speed of the cooling liquid pump and drive voltage of the radiator fan.
FIG. 5 is a table showing the relationships of the heat release value to the flow split ratio, the rotation speed of the cooling water pump and the drive voltage of the radiator fan.

FIG. 4 is a graph showing variations in releasable heat quantity Q and an operation pattern with regard to rotation speed rw of the cooling liquid pump 370 and drive voltage Vo of the radiator fan 360. The following first describes a general operation. An amount of heat release or heat release value from the radiator 350 is generally related to (surface temperature of the radiator 350–air temperature), (flow rate of the air) and (flow rate of the cooling liquid). The surface temperature of the radiator 350 may be assumed to be equal to the temperature of the cooling liquid in the radiator 350. The flow rate of the air is determined by the drive voltage Vo of the radiator fan 360 and the amount of wind. The amount of wind is determined by the vehicle speed. The flow rate of the cooling liquid by the cooling liquid pump 370 is proportional to the rotation speed rw of the cooling liquid pump 370. Accordingly, on the assumption that the vehicle speed, the ambient temperature and the surface temperature of the radiator 350 are respectively constant, the releasable heat quantity is determined by the rotation speed rw of the cooling liquid pump 370 and the drive voltage Vo of the radiator fan 360. An increase in rotation speed rw of the cooling liquid pump 370 or an increase in drive voltage Vo of the radiator fan 360 results in increasing the releasable heat quantity. This, however, increases the total power consumption of the cooling liquid pump 370 and the radiator fan 360. Increasing the drive voltage Vo of the radiator fan 360 without increasing the rotation speed rw of the cooling liquid pump 370 reduces the heat exchange efficiency between the cooling liquid in the radiator 350 and the air. This results in decreasing the heat release value from the radiator 350. It is accordingly preferable to increase the rotation speed rw of the cooling liquid pump 370 accompanied with an increase in drive voltage Vo of the radiator fan 360. According to this embodiment, the operation pattern is determined such that one of the rotation speed rw of the cooling liquid pump 370 and the drive voltage Vo of the radiator fan 360 is fixed alternately, while the other is varied. The operation pattern of the rotation speed rw of the cooling liquid pump 370 and the drive voltage Vo of the radiator fan 360 accordingly has a stepwise change. This simplifies the control, while reducing variations in actuators such as the cooling liquid pump 370 and the radiator fan 360 and suppressing NV (noise and vibration) caused by variations in the actuators. Fine control of the rotation speed rw of the cooling liquid pump 370 and the drive voltage Vo of the radiator fan 360 expands the map volume for storing the operation pattern but allows for control approximated by a smooth curve of broken line.

Figure 6:
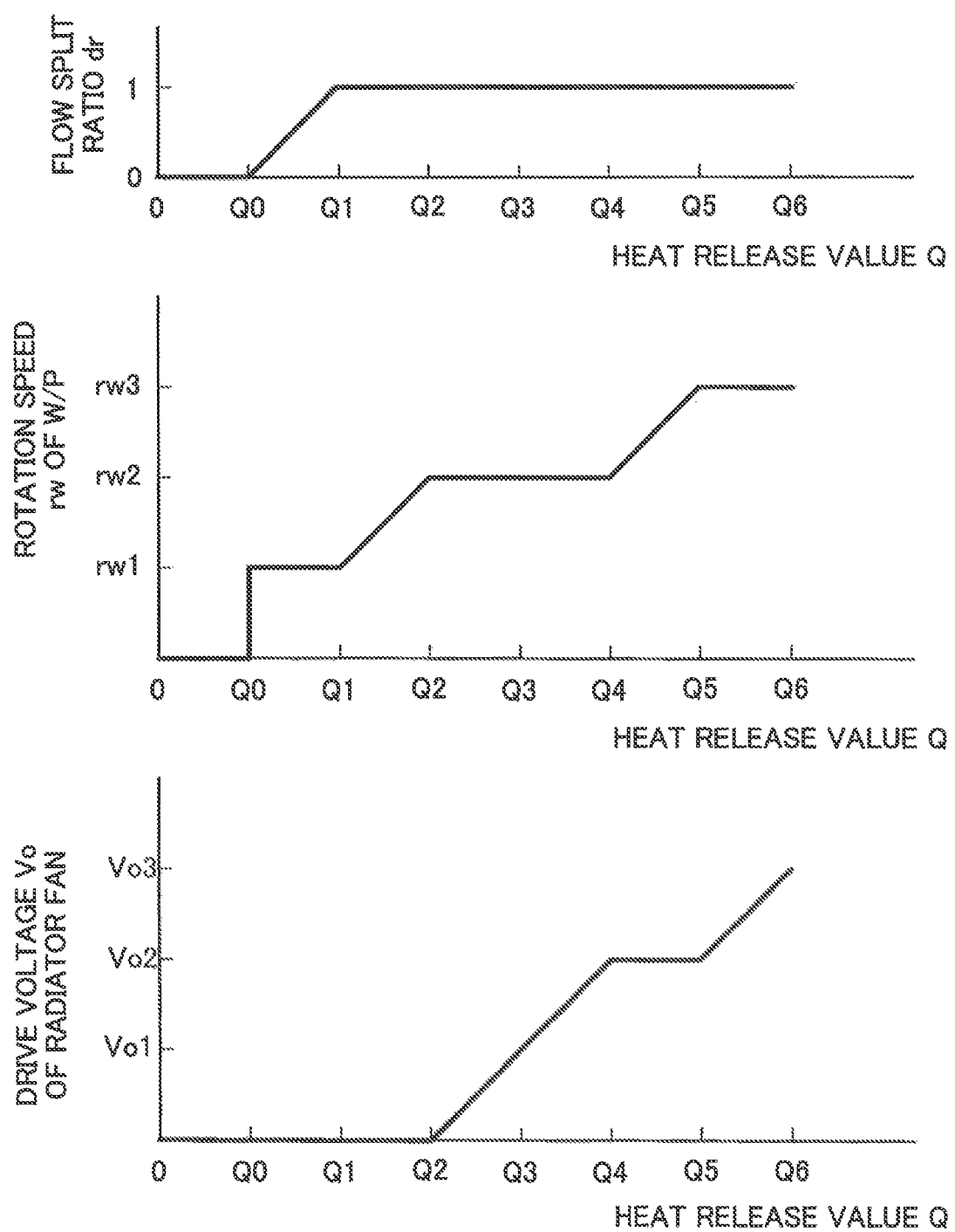
FIG. 6 is graphs showing the relationships of the heat release value to the flow split ratio, the rotation speed of the cooling water pump and the drive voltage of the radiator fan.

FIG. 5 is a table showing the relationships of the heat release value Q to the flow split ratio dr, the rotation speed rw of the cooling water pump 370 and the drive voltage Vo of the radiator fan 360. FIG. 6 is graphs showing the relationships of the heat release value Q to the flow split ratio dr, the rotation speed rw of the cooling water pump 370 and the drive voltage Vo of the radiator fan 360. In FIGS. 5 and 6, amounts of heat release Q0 to Q6 are not zero but are values gradually increasing in this sequence. Rotation speeds rw1 to rw3 are not zero but satisfy the relationship of rw1<rw2<rw3. Drive voltages Vo1 to Vo3 are not zero but satisfy the relationship of Vo1<Vo2<Vo3. An operation pattern shown in FIGS. 5 and 6 is determined to minimize the total power consumption of the cooling liquid pump 370 and the radiator fan 360, while suppressing noise and vibration. This operation pattern is accordingly not used when there is little need to suppress noise and vibration, for example, when priority is given to heat release over suppression of noise and vibration.

(1) In the case where the heat release value Q satisfies $0 \leq Q < Q0$:

In this case, the rotation speed rw of the cooling liquid pump 370 is 0, so that the cooling liquid is not circulated and the fuel cell 100 is hardly cooled down. In the description hereof, the heat release value Q denotes a heat quantity to be released, which is calculated from the heating value.

(2) In the case where the heat release value Q satisfies $Q0 \leq Q < Q1$:

The operation pattern calculator 250 sets the rotation speed rw of the cooling liquid pump 370 to rw1 to circulate the cooling liquid, sets the drive voltage Vo of the radiator fan 360 to 0, and regulates the flow split ratio dr in the range of 0 to 1 according to the heat release value Q. Even when the radiator fan 360 is not driven, the cooling liquid can be cooled down by natural cooling and the wind applied to the radiator 350 by running of the vehicle 10. The controller 200 may not necessarily fix the rotation speed rw of the cooling liquid pump 370 to rw1 but may regulate the rotation speed rw in the range of 0 to rw1 according to the heat release value Q.

(3) In the case where the heat release value Q satisfies $Q1 \leq Q < Q2$:

The operation pattern calculator 250 sets the flow split ratio dr to 1, sets the drive voltage Vo of the radiator fan 360 to 0, and regulates the rotation speed rw of the cooling liquid pump 370 in the range of rw1 to rw2. The flow-dividing valve 340 fixed to a specified valve position does not consume electric power. Setting the flow split ratio dr to 1 causes the cooling liquid to be entirely flowed to the radiator 350 and thus makes it easier to cool down the cooling liquid. The fuel cell 100 can thus be cooled down even at the low rotation speed rw of the cooling liquid pump 370. The advantage of this case is that the radiator fan 360 is not driven and thus causes no noise and vibration. When the heat release value Q is equal to or higher than Q1, the flow split ratio dr is fixed to 1. The following accordingly describes only the rotation speed rw of the cooling liquid pump 370 and the drive voltage Vo of the radiator fan 360.

(4) In the case where the heat release value Q satisfies $Q2 \leq Q < Q3$:

The operation pattern calculator 250 sets the rotation speed rw of the cooling liquid pump 370 to rw2 and regulates the drive voltage Vo of the radiator fan 360 in the range of 0 to Vo1 according to the heat release value Q.

(5) In the case where the heat release value Q satisfies $Q3 \leq Q < Q4$:

The operation pattern calculator 250 sets the rotation speed rw of the cooling liquid pump 370 to rw2 and regulates the drive voltage Vo of the radiator fan 360 in the range of Vo1 to Vo2 according to the heat release value Q. In other words, when the heat release value Q is equal to or higher than Q2 and is lower than Q4, the drive voltage Vo of the radiator fan 360 is regulated in the range of 0 to Vo2 according to the heat release value Q, while the rotation speed rw of the cooling liquid pump 370 is fixed to rw2.

(6) In the case where the heat release value Q satisfies Q4≤Q<Q5:

The operation pattern calculator 250 sets the drive voltage Vo of the radiator fan 360 to Vo2 and regulates the rotation speed rw of the cooling liquid pump 370 in the range of rw2 to rw3 according to the heat release value Q.

(7) In the case where the heat release value Q satisfies Q5≤Q<Q6:

The operation pattern calculator 250 sets the rotation speed rw of the cooling liquid pump 370 to rw3 and regulates the drive voltage Vo of the radiator fan 360 in the range of Vo2 to Vo3 according to the heat release value Q.

(8) In the case where the heat release value Q satisfies Q6≤Q:

The operation pattern calculator 250 sets the rotation speed rw of the cooling liquid pump 370 to rw3 and sets the drive voltage Vo of the radiator fan 360 to Vo3.

According to this embodiment, the drive voltage Vo of the radiator fan 360 is changed at four stages, i.e., 0, Vo1, Vo2 and Vo3, and the rotation speed rw of the cooling liquid pump 370 is changed at four stages, i.e., 0, rw1, rw2 and rw3. According to a modification, the operation pattern calculator 250 may change the drive voltage Vo of the radiator fan 360 or the rotation speed rw of the cooling liquid pump 370 at a greater number of stages, so as to allow for the finer control of the operation pattern.

According to this embodiment, the range of the heat release value Q is divided into a plurality of sections. In each section, the operation pattern calculator 250 fixes two of the drive voltage Vo of the radiator fan 360 (driving amount of the radiator fan 360), the rotation speed rw of the cooling liquid pump 370 and the valve position of the flow-dividing valve 340 and regulates the remaining one according to the heat release value Q. Accordingly, there is only one control parameter in each section. This simplifies the control and allows for heat release in each section with the minimum electric power.

According to this embodiment, when the heating value is not higher than the maximum heat release capacity, the controller 200 performs cooling control to make the heat release value Q equal to the heating value, so as to improve the fuel consumption. This control is called a first cooling control. When the heating value is higher than the maximum heat release capacity, on the other hand, the controller 200 drives the radiator fan 360 and the cooling liquid pump 370 to such an extent that does not cause significant noise and vibration. In this case, a difference (heating value−heat release value) is accumulated in the cooling liquid. The controller 200 integrates the heat accumulation. Upon satisfaction of at least one of large value of heat accumulation and high temperature of cooling liquid, the controller 200 increases the upper limit of the driving amount (drive voltage) of the radiator fan 360 to give priority to cooling. This control is called a second cooling control. In the case where the heating value is higher than the heat release value Q in a time duration to accumulate heat, even after the heating value becomes lower than the heat release value Q, cooling is continued until elimination of heat accumulation. The controller 200 determines whether heat accumulation is eliminated, based on the integrated value of heat accumulation or the temperature of the cooling liquid. When the heating value becomes lower than the heat release value Q, the controller 200 may decrease the upper limit of the driving amount of the radiator fan 360 to reduce noise and vibration. The following more specifically describes one example of such control flow.

Figure 7:
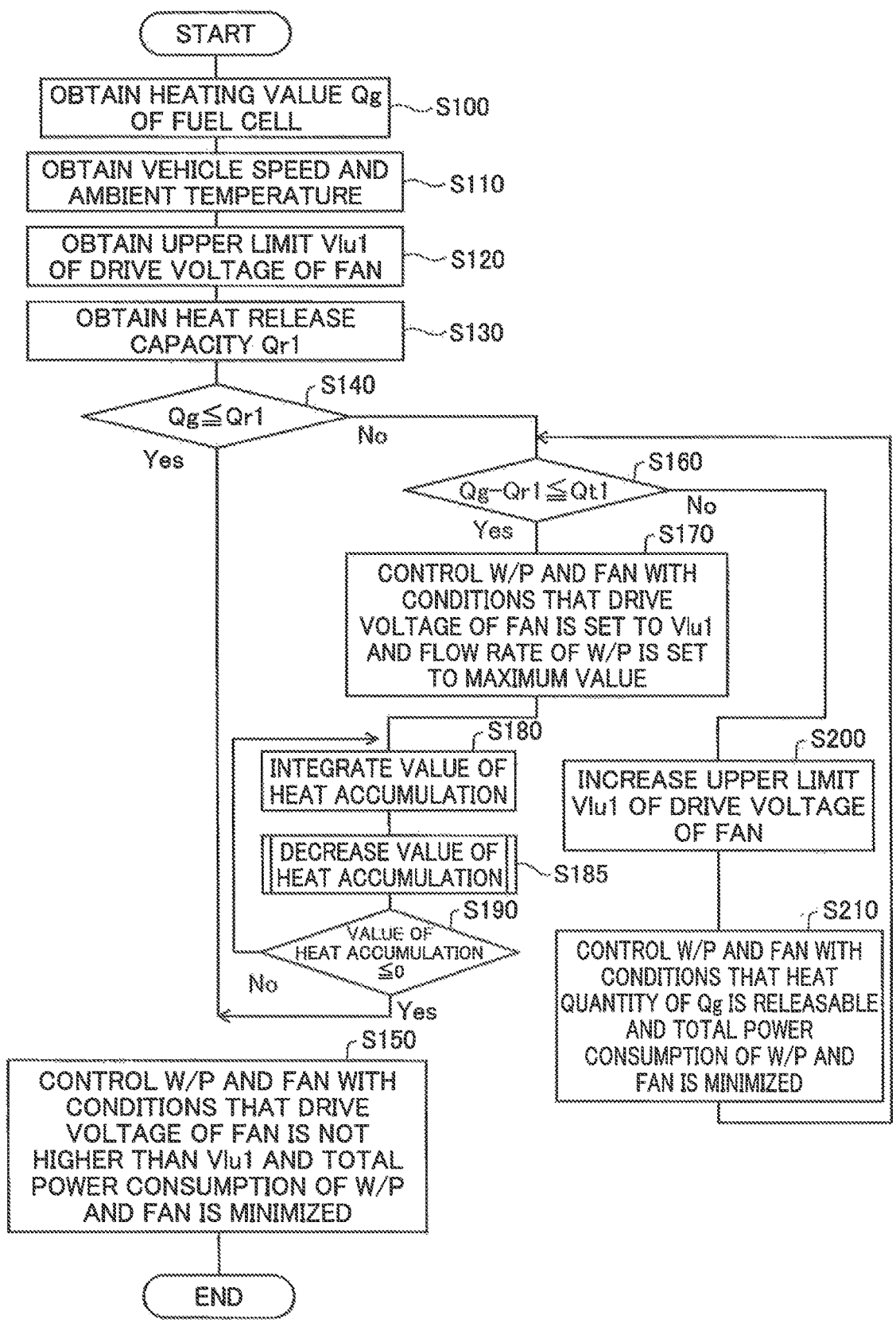
FIG. 7 is a flowchart showing one example of control flow according to this embodiment.

FIG. 7 is a flowchart showing one example of control flow according to this embodiment.

At step S100, the heating value calculator 210 calculates a heating value Qg of the fuel cell 100 from the electric current and the voltage of the fuel cell 100.

At step S110, the heat release capacity calculator 240 obtains the vehicle speed of the vehicle 10 and the ambient temperature. At step S120, the operation pattern calculator 250 obtains an upper limit Vlu1 of the drive voltage of the radiator fan 360. This upper limit Vlu1 is determined as described below. In general, the noise and vibration of the vehicle 10 depend on the speed of the vehicle 10, and the noise and vibration of the radiator fan 360 depend on the driving amount (drive voltage) of the radiator fan 360. The upper limit Vlu1 of the drive voltage of the radiator fan 360 is accordingly determined to such a drive voltage that makes the noise and vibration of the radiator fan 360 less noticeable by the noise and vibration of the vehicle 10. The operation pattern calculator 250 may store a map that represents a relationship between the vehicle speed and the upper limit Vlu1 of the drive voltage of the radiator fan.

At step S130, the heat release capacity calculator 240 calculates a heat release capacity Qr1 of the cooling system circuit 300 under the condition that the drive voltage of the radiator fan 360 does not exceed the upper limit Vlu1.

At step S140, the operation pattern calculator 250 compares the heating value Qg with the heat release capacity Qr1. When the heating value Qg is equal to or lower than the heat release capacity Qr1, the operation pattern calculator 250 proceeds to step S150 to specify an operation point on the operation pattern shown in FIG. 4 that satisfies the conditions that the drive voltage of the radiator fan 360 is not higher than the upper limit Vlu1 and the total power consumption of the cooling liquid pump 370 and the radiator fan 360 is minimized. For example, when the upper limit Vlu1 of the drive voltage of the radiator fan 360 determined according to the speed of the vehicle 10 is Vo3 and the heating value Qg satisfies Q5≤Qg<Q6, the operation pattern calculator 250 sets the rotation speed rw of the cooling liquid pump 370 to rw3 and regulates the drive voltage Vo of the radiator fan 360 in the range of Vo2 to Vo3 to specify a drive voltage that allows a heat quantity corresponding to the heating value Qg to be released, as an operation point. At this operation point, the heating value is equal to the heat release value. In another example, when the upper limit Vlu1 of the drive voltage of the radiator fan 360 determined according to the speed of the vehicle 10 is Vo2 and the heating value Qg satisfies Q4≤Qg<Q5, the operation pattern calculator 250 sets the drive voltage Vo of the radiator fan 360 to Vo2 and regulates the rotation speed rw of the cooling liquid pump 370 in the range of rw2 to rw3 to specify a rotation speed that allows a heat quantity corresponding to the heating value Qg to be released, as an operation point. At this operation point, the heat value is equal to the heat release value. The operation pattern calculator 250 then causes the fan controller 260 and the cooling liquid pump controller 270 to respectively control the radiator fan 360 and the cooling liquid pump 370 at the specified operation point to make the heating value equal to the heat release value.

When the heat release capacity Qr1 is lower than the heating value Qg at step S140, the operation pattern calculator 250 proceeds to step S160 to determine whether a difference (Qg−Qr1) of subtraction of the heat release capacity Qr1 from the heating value Qg is equal to or lower than a predetermined criterion value Qt1. When the difference (Qg−Qr1) is equal to or lower than the criterion value Qt1, the operation pattern calculator 250 proceeds to step S170 to specify an operation point that satisfies the conditions that the drive voltage of the radiator fan 360 is set to the upper limit Vlu1 and the rotation speed rw of the cooling liquid pump 370 is set to its maximum value. For example, when the upper limit Vlu1 of the drive voltage of the radiator fan 360 determined according to the speed of the vehicle 10 is Vo2 and the heating value Qg satisfies Q4≤Qg<Q5, the operation pattern calculator 250 specifies an operation point that satisfies the conditions that the dive voltage Vo of the radiator fan 360 is set to Vo2 and the rotation speed rw of the cooling liquid pump 370 is set to rw3. At this operation point, a heat quantity identical with the heat release capacity Qr1 is releasable. The heating value Qg is, however, higher than the heat release capacity Qr1, the difference (Qg−Qr1) is accumulated in the cooling liquid to increase the temperature of the cooling liquid. The difference (Qg−Qr1) is equal to or lower than the predetermined criterion value Qt1, so that the temperature of the fuel cell 100 is unlikely to increase drastically. In this case, operation of the fuel cell 100 can be continued. Controlling the radiator fan 360 and the cooling liquid pump 370 at this specified operation point increases the power consumption of the cooling liquid pump 370 but still suppresses noise and vibration. At step S180, the operation pattern calculator 250 integrates the value of heat accumulation.

At subsequent step S185, the operation pattern calculator 250 performs a series of processing when the heating value Qg becomes lower than the heat release capacity Qr1. When the heating value Qg becomes lower than the heat release capacity Qr1, the value of heat accumulation is reduced. The details of the processing when the heating value Qg becomes lower than the heat release capacity Qr1 will be described later. When it is determined at step S190 that the value of heat accumulation becomes equal to or lower than 0, the operation pattern calculator 250 proceeds to step S150. It is determinable whether the value of heat accumulation becomes equal to or lower than 0 by, for example, measuring the temperature of the cooling liquid. The operation pattern calculator 250 may determine that the value of heat accumulation becomes equal to or lower than 0, when the temperature of the cooling liquid becomes equal to or lower than a predetermined criterion temperature. In this case, the heating value is lower than the heat release value, so that the value of heat accumulation may be calculated by integrating the difference (negative value) between the heating value and the heat release value.

When the difference (Qg−Qr1) of subtraction of the heat release capacity Qr1 from the heating value Qg is higher than the predetermined criterion value Qt1 at step S160, the temperature of the fuel cell 100 is likely to increase drastically and exceed an allowable operation temperature range. The operation pattern calculator 250 accordingly determines an operation pattern that accelerates cooling of the fuel cell 100 without taking into account noise and vibration. More specifically, the operation pattern calculator 250 proceeds to step S200 to increase the upper limit lu1 of the drive voltage of the radiator fan 360 determined at step S120 by taking into account noise and vibration. It is, however, preferable that the drive voltage of the radiator fan 360 does not exceed its rated value. At step S210, the operation pattern calculator 250 specifies an operation point that satisfies the conditions that a heat quantity corresponding to the heating value Qg is releasable and the total power consumption of the cooling liquid pump 370 and the radiator fan 360 is minimized. The operation pattern calculator 250 then causes the fan controller 260 and the cooling liquid pump controller 270 to respectively control the radiator fan 360 and the cooling liquid pump 370 at the specified operation point. In this case, the operation pattern shown in FIGS. 4 to 6 is not employed. Controlling the radiator fan 360 and the cooling liquid pump 370 at this specified operation point allows for the heating value Qg of the fuel cell 100 to be released and suppresses a temperature increase of the fuel cell 100, although increasing noise and vibration. This embodiment selects the flow proceeding to step S170 and subsequent steps or the flow proceedings to steps S200 and S210, based on the difference of subtraction of the heat release capacity Qr1 from the heating value Qg. One modification may skip the processing of steps S160 and S170 but perform the processing of steps S200 and S210, when the heating value Qg is higher than the heat release capacity Qr1. When there is no operation point that satisfies the condition that a heat quantity corresponding to the heating value Qg is releasable, the operation pattern calculator 250 may maximize the drive voltage of the radiator fan 360 to maximize the heat release capacity at step S210. In this case, the remaining heat that is not released is accumulated in the cooling liquid. Even after the heating value Qg is decreased, cooling may be continued until elimination of heat accumulation. When the heating value Qg is decreased, the operation pattern calculator 250 may decrease the upper limit Vlu1 of the drive voltage of the radiator fan 360 and give priority to suppression of noise and vibration.

Figure 8:
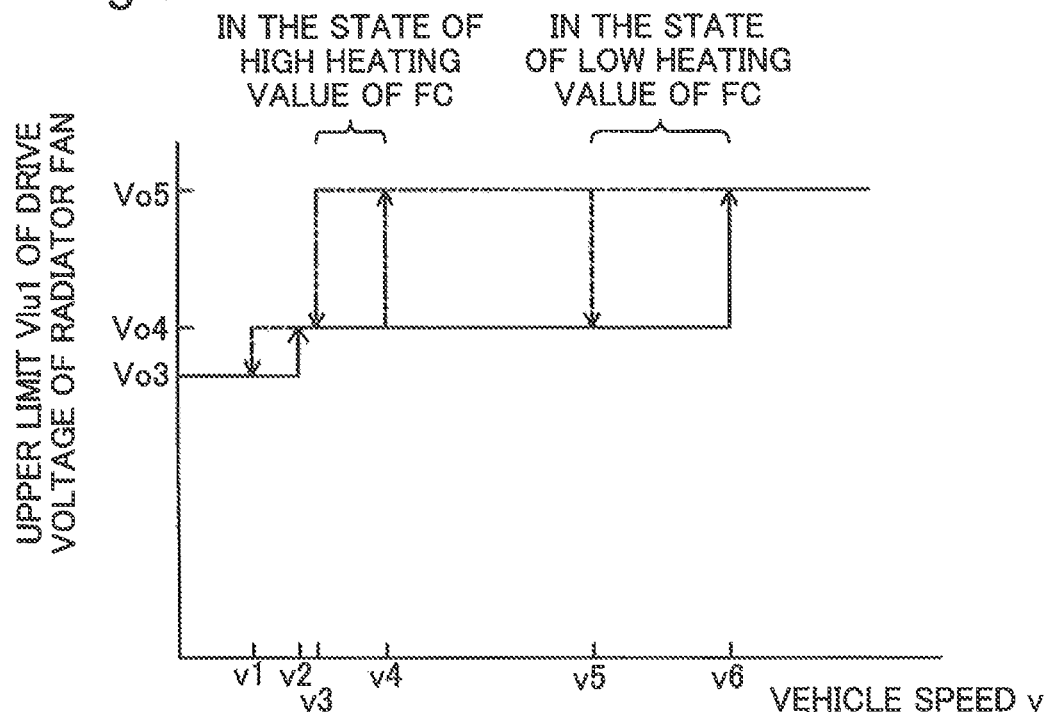
FIG. 8 is a graph showing one example of relationship between vehicle speed and upper limit of the drive voltage of the radiator fan with regard to different heating values of the fuel cell.

FIG. 8 is a graph showing one example of relationship between vehicle speed v and upper limit Vlu1 of the drive voltage of the radiator fan 360 with regard to different heating values of the fuel cell 100. The operation pattern calculator 250 may determine the upper limit Vlu1 of the drive voltage of the radiator fan 360 by taking into account the heating value of the fuel cell 100, in addition to the vehicle speed v. The upper limit Vlu1 of the drive voltage of the fan 360 is increased from Vo3 to Vo4 with an increase in vehicle speed v of the vehicle 10 to v2. When the fuel cell 100 has a low heating value (shown by the solid line), the upper limit. Vlu1 of the drive voltage of the radiator fan 360 is increased from Vo4 to Vo5 with an increase in vehicle speed v to v6. When the fuel cell 100 has a high heating value (shown by the one-dot chain line), on the other hand, the upper limit Vlu1 of the drive voltage of the radiator fan 360 is increased from Vo4 to Vo5 with an increase in vehicle speed v to v4 (v4<v6). By taking into account noise and vibration, it is preferable to set the upper limit Vlu1 of the drive voltage of the radiator fan 360 to be lower than Vo5 at the vehicle speed v of lower than v6. When the fuel cell 100 has a high heating value (shown by the one-dot chain line), however, the operation pattern calculator 250 does not consider noise and vibration. In this case, the upper limit Vlu1 of the rive voltage of the radiator fan 360 is increased to Vo5 with an increase in vehicle speed v to v4. This gives priority to cooling of the fuel cell 100, although making noise and vibration caused by the radiator fan 360 noticeable relative to noise and vibration based on the vehicle speed v.

According to this embodiment, in the case of decreasing the vehicle speed v when the fuel cell 100 has a low heating value (shown by the broken line), the upper limit Vlu1 of the drive voltage of the radiator fan 360 is decreased to Vo4 only after a decrease in vehicle speed v to v5 (v5<v6). When the fuel cell 100 has a high heating value (shown by the two-dot chain line), on the other hand, the upper limit Vlu1 of the drive voltage of the radiator fan 360 is decreased to Vo3 only after a decrease in vehicle speed v to v3 (v3<v4<v5). In this manner, hysteresis may be provided between the vehicle speed v and the upper limit Vlu1 of the drive voltage of the radiator fan 360. This suppresses the hunting phenomenon that the upper limit Vlu1 of the drive voltage of the fan 360 is varied even with a slight variation of the vehicle speed v.

Figure 9:
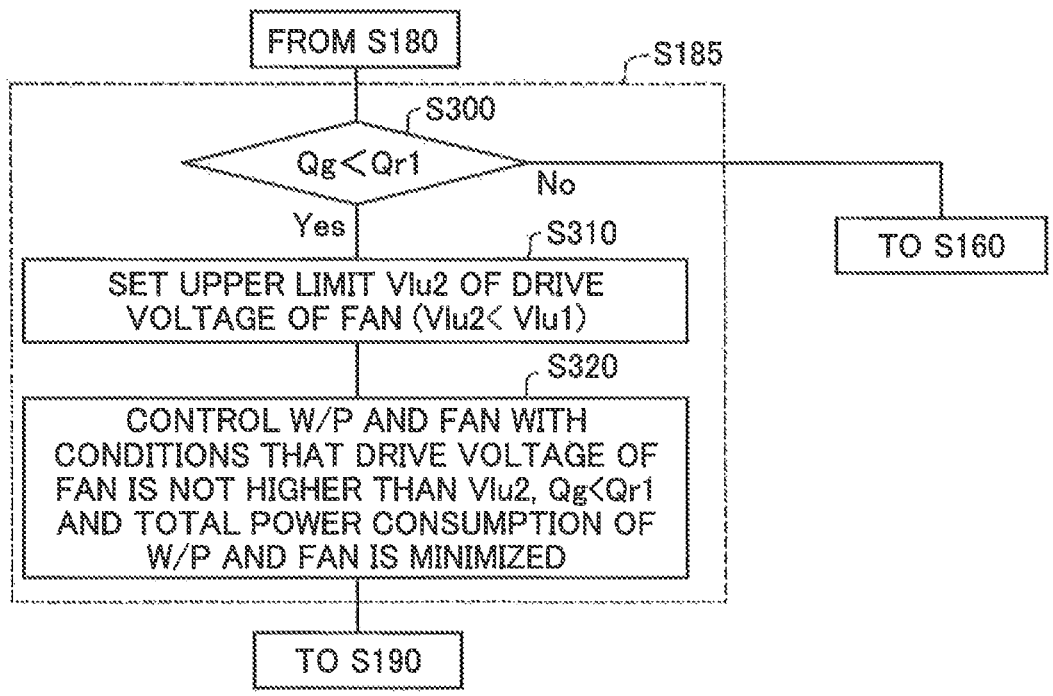
FIG. 9 is a flowchart showing the details of the processing of step S185 in FIG. 7.

FIG. 9 is a flowchart showing the details of the processing of step S185 in FIG. 7. After step S180 in FIG. 7, the operation pattern calculator 250 proceeds to step S300 to determine whether the heating value Qg becomes lower than the heat release capacity Qr1. When the heating value Qg is equal to or higher than the heat release capacity Qr1, the value of heat accumulation in the cooling liquid is not decreased. The operation pattern calculator 250 accordingly proceeds to step S160 in FIG. 7. When the heating value Qg is lower than the heat release capacity Qr1 at step S300, on the other hand, the operation pattern calculator 250 sets the upper limit of the drive voltage of the radiator fan 360 to Vlu2 at step S310. This upper limit voltage Vlu2 is lower than the upper limit voltage Vlu1 determined based on the noise and vibration (vehicle speed).

Figure 10:
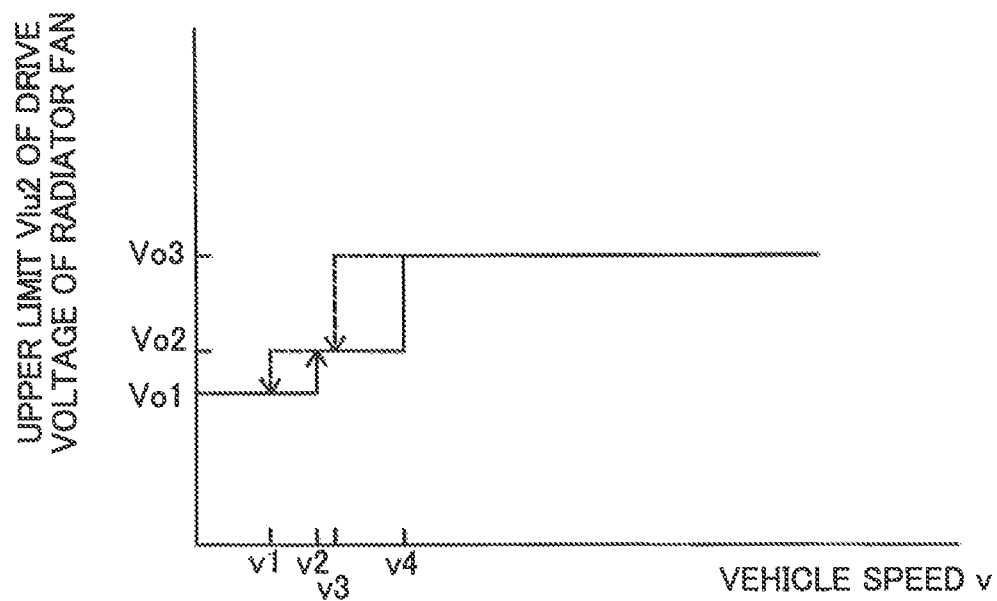
FIG. 10 is a graph showing one example of relationship between vehicle speed and upper limit of the drive voltage of the radiator fan with regard to different heating values of the fuel cell.

FIG. 10 is a graph showing one example of relationship between vehicle speed v and upper limit Vlu2 of the drive voltage of the radiator fan 360 with regard to different heating values of the fuel cell 100. According to comparison with the graph of FIG. 8, the upper limit Vlu2 of the drive voltage of the radiator fan 360 at a vehicle speed v shown in FIG. 10 is lower than the upper limit Vlu1 of the drive voltage of the radiator fan 360 at the same vehicle speed v shown in FIG. 8.

At subsequent step S320 in FIG. 9, the operation pattern calculator 250 specifies an operation point that satisfies the three conditions that the drive voltage of the radiator fan 360 is not higher than the upper limit Vlu2, the heating value Qg is lower than the heat release capacity Qr1, and the total power consumption of the cooling liquid pump 370 and the radiator fan 360 is minimized. The operation pattern calculator 250 then causes the fan controller 260 and the cooling liquid pump controller 270 to respectively control the radiator fan 360 and the cooling liquid pump 370 at the specified operation point. For example, when the upper limit Vlu1 of the drive voltage of the radiator fan 360 determined according to the speed of the vehicle 10 is Vo3, the operation pattern calculator 250 sets the upper limit Vlu2 of the drive voltage of the radiator fan 360 to Vo2 that is lower than Vo3. When the heat value Qr to be released satisfies Q4≤Qr<Q5, the operation pattern calculator 250 sets the drive voltage of the radiator fan 360 to Vo2 and regulates the rotation speed rw of the cooling liquid pump 370 to specify an operation point. This makes a heat quantity corresponding to the heating value Qg releasable, while reducing the total power consumption of the cooling liquid pump 370 and the radiator fan 360. This also suppresses overcooling by a delayed temperature response and resulting increase in power consumption.

According to this embodiment, the operation pattern calculator 250 sets the upper limit of the drive voltage of the radiator fan 360 to Vlu2 at step S310 in FIG. 9. According to a modification, the operation pattern calculator 250 may keep the upper limit of the drive voltage of the radiator fan 360 at Vlu1 and maintain the flow rate. This accelerates heat release, compared with setting the upper limit of the drive voltage of the radiator fan 360 to Vlu2.

As described above, according to this embodiment, the operation pattern calculator 250 sets the upper limit VLu1 of the drive voltage Vo of the radiator fan 360 based on the speed of the vehicle 10 and calculates the heating value of the fuel cell 100 from the amount of power generation by the fuel cell 100. The operation pattern calculator 250 also controls the rotation speed rw (flow rate) of the cooling liquid pump 370, the drive voltage Vo of the radiator fan 360, and the flow split ratio dr of the flow-dividing valve 340 to satisfy the conditions that a heat quantity corresponding to the heating value is releasable and the total power consumption of the cooling liquid pump 370 and the radiator fan 360 is minimized under the upper limit of the drive voltage of the radiator fan 360. This achieves both suppression of noise and vibration and reduction of power consumption. When the difference of subtraction of the heat release value from the heating value is equal to or higher than the predetermined criterion value, the operation pattern calculator 250 controls the rotation speed rw of the cooling liquid pump 370 and the drive voltage Vo of the radiator fan 360 without the upper limit of the drive voltage of the radiator fan 360 to satisfy the conditions that a heat quantity corresponding to the heating value is releasable and the total power consumption of the cooling liquid pump 370 and the radiator fan 360 is minimized. This gives priority to cooling of the fuel cell 100 over suppression of noise and vibration.

According to this embodiment, the operation pattern calculator 250 sets the upper limit VLu1 of the drive voltage Vo of the radiator fan 360 based on the speed of the vehicle 10 and calculates the heating value of the fuel cell 100 from the amount of power generation by the fuel cell 100. According to a modification, the operation pattern calculator 250 may store a map representing a relationship between the heat release value and the drive voltage Vo of the radiator fan 360 and the rotation speed rw of the cooling liquid pump 370 to minimize the total power consumption with regard to different vehicle speeds.

Figure 11:
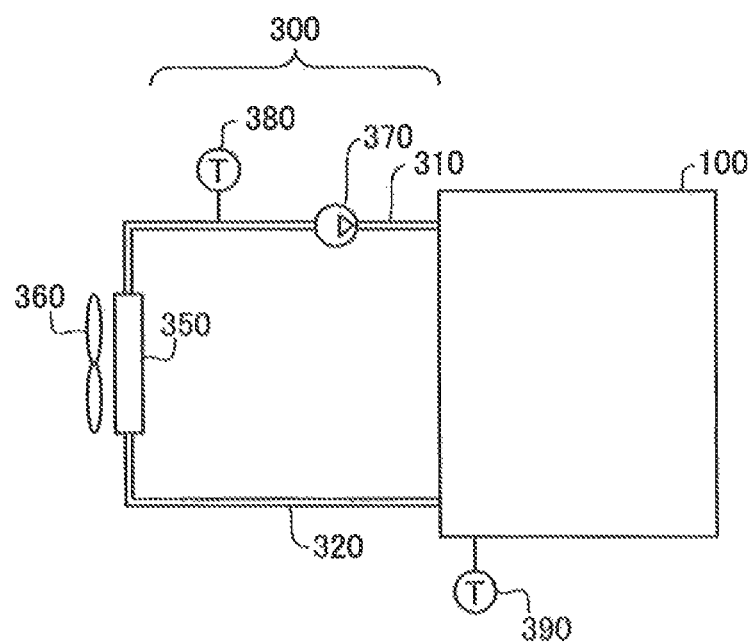
FIG. 11 is a diagram illustrating a fuel cell and a cooling system circuit for the fuel cell according to a modification.

Modification:

FIG. 11 is a diagram illustrating a fuel cell and a cooling system circuit for the fuel cell according to a modification. The cooling system circuit of FIG. 11 differs from the cooling system circuit 300 of FIG. 2 by omission of the bypass piping 330 and the flow-dividing valve 340. As described above with reference to FIGS. 5 and 6, when the heat release value is higher than Q1, the flow split ratio is set to 1 (i.e., the cooling liquid is entirely flowed to the radiator 350). The bypass piping 330 and the flow-dividing valve 340 may thus be omitted. In this modified configuration, the temperature of the cooling liquid is controlled by regulating the driving amount of the radiator fan 360 and the flow rate of the cooling liquid pump 370. The control in this modified configuration is equivalent to the control in the configuration of the embodiment with setting the flow split ratio to 1 when the heat release value is higher than Q1. According to another modification, only the flow-dividing valve 340 may be excluded from the configuration of FIG. 2. The control in this modified configuration is equivalent to the control in the configuration of the embodiment with setting the flow split ratio to a fixed value in the range of 0 to 1. In this modified configuration, the temperature of the cooling liquid is also controlled by regulating the driving amount of the radiator fan 360 and the flow rate of the cooling liquid pump 370.

The foregoing describes some aspects of the invention with reference to some embodiments and examples. The embodiments and the examples of the invention described above are provided only for the purpose of facilitating the understanding of the invention and not for the purpose of limiting the invention in any sense. The invention may be changed, modified and altered without departing from the scope of the invention and includes equivalents thereof.

What is claimed is:

1. A fuel cell system that is mounted on a fuel cell vehicle, the fuel cell system comprising:
   a fuel cell;
   a cooling system circuit including a cooling liquid supply path that is configured to supply a cooling liquid to the fuel cell, a radiator that is configured to cool down the cooling liquid, a radiator fan, and a cooling liquid pump that is provided in the cooling liquid supply path to feed the cooling liquid to the fuel cell;
   a controller; and
   a speedometer that is configured to obtain a speed of the fuel cell vehicle, wherein the controller is programmed to:
      perform a first cooling control that sets an upper limit value of a driving amount of the radiator fan according to the speed of the fuel cell vehicle and regulates a flow rate of the cooling liquid pump or the driving amount of the radiator fan under the upper limit value of the driving amount of the radiator fan, so as to cool down the fuel cell,
   wherein in the first cooling control, the controller is programmed to:
      divide a heat release capacity range specified by the flow rate of the cooling liquid pump and the driving amount of the radiator fan into at least two sections, and
      change one of the flow rate of the cooling liquid pump and the driving amount of the radiator fan while fixing the other, in order to achieve a heat release value in each of the at least two sections by minimum electric power.

2. The fuel cell system according to claim 1, wherein in the first cooling control, the controller is programmed to:
   calculate a heating value of the fuel cell from an amount of power generation by the fuel cell; and
   regulate the flow rate of the cooling liquid pump and the driving amount of the radiator fan under the upper limit value of the driving amount of the radiator fan, such that the heating value is released while minimizing total power consumption of the cooling liquid pump and the radiator fan.

3. The fuel cell system according to claim 2, wherein when the heating value is not entirely releasable from the cooling system circuit in the first cooling control, the controller is programmed to:
   cause a heat quantity corresponding to a difference of subtraction of the heat release value from the heating value to be accumulated in the cooling liquid; and
   even after the heating value becomes lower than the heat release value, maintain the flow rate of the cooling liquid pump and the driving amount of the radiator fan until temperature of the cooling liquid decreases to or below a predetermined temperature.

4. The fuel cell system according to claim 3, wherein when the heat quantity accumulated in the cooling liquid is released in the first cooling control, the controller is programmed to:
   set a lower driving amount that is lower than the upper limit value set according to the speed of the fuel cell vehicle; and
   maintain the flow rate of the cooling liquid pump and the driving amount of the radiator fan while using the lower driving amount as an upper limit until the temperature of the cooling liquid decreases to or below a predetermined temperature.

5. The fuel cell system according to claim 2, wherein when the heating value is not entirely releasable from the cooling system circuit in the first cooling control, the controller is programmed to:
   cause a heat quantity corresponding to a difference of subtraction of the heat release value from the heating value to be accumulated in the cooling liquid; and
   even after the heating value becomes lower than the heat release value, maintain the flow rate of the cooling liquid pump and the driving amount of the radiator fan until the accumulated heat quantity decreases to or below a predetermined value.

6. The fuel cell system according to claim 5, wherein when the heat quantity accumulated in the cooling liquid is released in the first cooling control, the controller is programmed to:
   set a lower driving amount that is lower than the upper limit value set according to the speed of the fuel cell vehicle; and
   drive the cooling liquid pump and the radiator fan while using the lower driving amount as an upper limit until the accumulated heat quantity decreases to or below a predetermined value.

7. The fuel cell system according to claim 2, wherein when the heating value is not entirely releasable in the first cooling control and an accumulated heat quantity by accumulating a difference of subtraction of the heat release value from the heating value in the cooling liquid is higher than a predetermined heat quantity, the controller is programmed to perform a second cooling control in which the controller:
   changes the upper limit value of the driving amount of the radiator fan set according to the speed of the fuel cell vehicle to a higher driving amount; and
   regulates the flow rate of the cooling liquid pump and the driving amount of the radiator fan while using the higher driving amount as a new upper limit value, so as to cool down the fuel cell.

8. The fuel cell system according to claim 2, wherein when the heating value is not entirely releasable in the first cooling control and temperature of the cooling liquid is higher than a predetermined temperature, the controller is programmed to perform a second cooling control in which the controller:
   changes the upper limit value of the driving amount of the radiator fan set according to the speed of the fuel cell vehicle to a higher driving amount; and
   regulates the flow rate of the cooling liquid pump and the driving amount of the radiator fan while using the higher driving amount as a new upper limit value, so as to cool down the fuel cell.

9. The fuel cell system according to claim 1, further comprising:
   bypass piping that is configured to cause a flow of the cooling liquid discharged from the fuel cell to bypass the radiator and to be supplied to the cooling liquid pump; and
   a flow-dividing valve that is configured to divide the flow of the cooling liquid discharged from the fuel cell into the radiator and the bypass piping, wherein in the first cooling control, the controller is programmed to:
calculate a heating value of the fuel cell from an amount of power generation by the fuel cell, and
regulate the flow rate of the cooling liquid pump, the driving amount of the radiator fan, and a flow split ratio of the flow-dividing value under the upper limit value of the driving amount of the radiator fan, such that the heating value is released while minimizing total power consumption of the cooling liquid pump and the radiator fan.

10. The fuel cell system according to claim 9, wherein in the first cooling control, the controller is programmed to:
drive the heat release capacity range specified by the flow rate of the cooling liquid pump, the driving amount of the radiator fan, and the flow split ratio of the flow-dividing valve into at least two sections; and
change one of the flow rate of the cooling liquid pump, the driving amount of the radiator fan, and the flow split ratio of the flow-dividing valve, in order to achieve the heat release value in each of the at least two sections by minimum electric power.

11. A fuel cell vehicle comprising the fuel cell system according to claim 1 mounted thereon.

12. A control method of a fuel cell system that is mounted on a fuel cell vehicle, the fuel cell system comprising:
a fuel cell;
a cooling liquid supply path that is configured to supply a cooling liquid to the fuel cell;
a radiator that is configured to cool down the cooling liquid;
a radiator fan;
a cooling liquid pump that is provided in the cooling liquid supply path to feed the cooling liquid to the fuel cell; and
a speedometer, the control method comprising:
performing a first cooling control that sets an upper limit value of a driving amount of the radiator fan according to the speed of the fuel cell vehicle and regulates a flow rate of the cooling liquid pump or the driving amount of the radiator fan under the upper limit value of the driving amount of the radiator fan, so as to cool down the fuel cell,
wherein the first cooling control includes dividing a heat release capacity range specified by the flow rate of the cooling liquid pump and the driving amount of the radiator fan into at least two sections, and changing one of the flow rate of the cooling liquid pump and the driving amount of the radiator fan while fixing the other, in order to achieve a heat release value in each of the at least two sections by minimum electric power.

13. The control method of the fuel cell system according to claim 12, the control method further comprising:
in the first cooling control, calculating a heating value of the fuel cell from an amount of power generation by the fuel cell; and
regulating the flow rate of the cooling liquid pump and the driving amount of the radiator fan under the upper limit value of the driving amount of the radiator fan, such that the heating value is released while minimizing total power consumption of the cooling liquid pump and the radiator fan.

14. The control method of the fuel cell system according to claim 13, the control method further comprising:
when the heating value is not entirely releasable in the first cooling control, causing a heat quantity corresponding to a difference of subtraction of the heat release value from the heating value to be accumulated in the cooling liquid; and
even after the heating value becomes lower than the heat release value, maintaining the flow rate of the cooling liquid pump and the driving amount of the radiator fan until temperature of the cooling liquid decreases to or below a predetermined temperature.

15. The control method of the fuel cell system according to claim 14, the control method further comprising:
when the heat quantity accumulated in the cooling liquid is released in the first cooling control, setting a lower driving amount that is lower than the upper limit value set according to the speed of the fuel cell vehicle; and
maintaining the flow rate of the cooling liquid pump and the driving amount of the radiator fan while using the lower driving amount as an upper limit until the temperature of the cooling liquid decreases to or below a predetermined temperature.

16. The control method of the fuel cell system according to claim 13, the control method further comprising:
when the heating value is not entirely releasable in the first cooling control, causing a heat quantity corresponding to a difference of subtraction of the heat release value from the heating value to be accumulated in the cooling liquid; and
even after the heating value becomes lower than the heat release value, maintaining the flow rate of the cooling liquid pump and the driving amount of the radiator fan until the accumulated heat quantity decreases to or below a predetermined value.

17. The control method of the fuel cell system according to claim 16, the control method further comprising:
when the heat quantity accumulated in the cooling liquid is released in the first cooling control, setting a lower driving amount that is lower than the upper limit value set according to the speed of the fuel cell vehicle; and
driving the cooling liquid pump and the radiator fan while using the lower driving amount as an upper limit until the accumulated heat quantity decreases to or below a predetermined value.

18. The control method of the fuel cell system according to claim 13, the control method further comprising:
when the heating value is not entirely releasable in the first cooling control and an accumulated heat quantity by accumulating a difference of subtraction of the heat release value from the heating value in the cooling liquid is higher than a predetermined heat quantity, performing a second cooling control that changes the upper limit value of the driving amount of the radiator fan set according to the speed of the fuel cell vehicle to a higher driving amount; and
regulating the flow rate of the cooling liquid pump and the driving amount of the radiator fan while using the higher driving amount as a new upper limit value, so as to cool down the fuel cell.

19. The control method of the fuel cell system according to claim 13, the control method further comprising:
when the heating value is not entirely releasable in the first cooling control and temperature of the cooling liquid is higher than a predetermined temperature, performing a second cooling control that changes the upper limit value of the driving amount of the radiator fan set according to the speed of the fuel cell vehicle to a higher driving amount; and regulating the flow rate of the cooling liquid pump and the driving amount of the radiator fan while using the higher driving amount as a new upper limit value, so as to cool down the fuel cell.

\* \* \* \* \*